Feb. 27, 1951  O. F. ANDERSON  2,543,430
PLUG FOR SEALING TUBE SHEETS
Filed Dec. 17, 1945
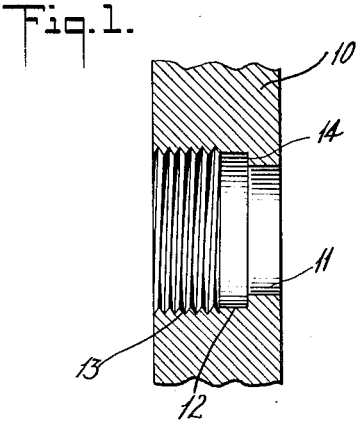
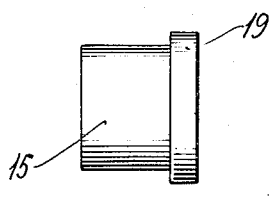
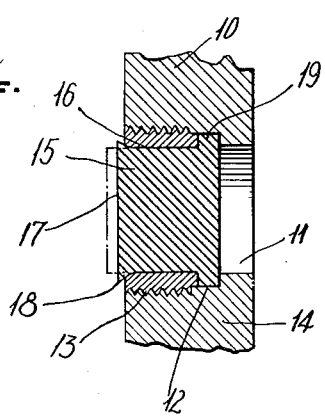
INVENTOR
OLAF F. ANDERSON
BY
Howard Thompson
ATTORNEY Patented Feb. 27, 1951

2,543,430

UNITED STATES PATENT OFFICE 2,543,430

PLUG FOR SEALING TUBE SHEETS

Olaf F. Anderson, Fort Lee, N. J., assignor to Condenser Service & Engineering Co., Inc., Hoboken, N. J., a corporation of New Jersey Application December 17, 1945, Serial No. 635,567

2 Claims. (Cl. 220—24.5)

This invention relates to tube sheets of tube units of various kinds and classes. More particularly, the invention deals with means for plugging the tube aperture or apertures of tube sheets of the kind and class defined in the event of a breakdown of the tube mounting therein in order to provide a temporary repair. The novel features of the invention will be best understood from the following description, when taken together with the accompanying drawing, in which certain embodiments of the invention are disclosed and, in which, the separate parts are designated by suitable reference characters in each of the views and in which:

Fig. 1 is a sectional view through a portion of a tube sheet showing the boring and threading thereof.

Fig. 2 is a detail view of a fibre sleeve which I employ.

Fig. 3 is a detail view of a lead plug which I employ; and

Fig. 4 is a sectional view showing the assemblage of the plug unit in the tube sheet.

In condensers, heat exchangers and other apparatus of this type and kind, it often occurs that the mounting of a tube in the tube sheet becomes so bad as to necessitate removal of the tube and, in order to perform a quick emergency repair, I employ a plug unit for plugging the tube receiving aperture of the tube plate upon removal of the tube in a manner to prevent leakage through said aperture of the plate and to suffice until such time as necessary repairs or changes in installation can be made.

In Fig. 1 of the drawing, I have shown at 10 a small section of a tube unit or bundle, in which one of the tube supporting apertures 11 has been counterbored, as at 12, and preferably threaded or otherwise roughened, as at 13, preferably outwardly beyond a shoulder portion 14. This counterboring facilitates insertion of that which I would term a plug or plug unit comprising two parts, namely a plug part 15 and a sealing sleeve 16, shown in detail in Figs. 3 and 2 of the drawing respectively, and assembled in Fig. 4.

The plug 15 may be composed of any suitable material but is preferably composed of lead. The sealing sleeve 16 is preferably composed of a relatively soft material to have the property of expanding when exposed to moisture, such as fibre, which will insure a perfect seal, particularly in expanding the periphery of the sleeve into the threads or other roughened surface 13 substantially in the manner illustrated in Fig. 4 of the drawing. This expansion is initially accomplished in driving the outer end 17 of the plug 15 inwardly from the dot-dash line position of Fig. 4 to the full line position, in which operation the end of the plug is flared, as seen at 18. The inner end of the plug has an annular enlarged collar 19 which fits in the unthreaded or unroughened portion of the bore 12 and seats against the shoulder 14, thus checking inward movement of the plug.

The sleeve 16 may be composed of fibre and, in initially driving the plug into position, part of the fibre will extend into the grooves of the teeth or roughened surface and will be further expanded therein when moisture contacts said sleeve.

While a substantial seal will be effected in expansion of the enlarged collar portion 19 of the lead plug 15, the sleeve 16 will serve as a double check in insuring a positive seal and in securely retaining the plug in position in the aperture 11 or the counterbore portion 12 thereof. It will thus be apparent that the sleeve, in addition to functioning as a sealing sleeve, also functions as a key sleeve for retaining the plug against displacement from the tube sheet 10.

It will be apparent that the enlargement 19 may also be considered as a head on the inner end of the plug. It will also appear that the sleeve 16 is shorter than the reduced or body portion of the plug to permit the riveting over or flaring of the plug end, as at 18.

The method of procedure followed in providing a closure in the tube aperture of a tube sheet will be to first remove the worn or corroded tube and, then, to counterbore the tube aperture to form the enlarged bore 12 and, then, forming circumferential teeth or grooves, threads or other roughened surface, as at 13. The tube plate or sheet is now ready for the reception of the plug. The plug body 15 with the sleeve 16 thereon is then placed or pressed into the bore 12 to seat snugly upon the shoulder 14, after which further pressure is applied or the plug is hammered to flare the same, in which operation the material of the sleeve is expanded into the grooves or recesses produced by roughening the surface of the bore 12.

In the present illustration, the size of the teeth or corresponding grooves are exaggerated for sake of clarity in illustration.

Having fully described my invention, what I claim as new and desire to secure by Letters Patent is:

1. In tube units employing tube plates having tube receiving apertures therein, means for forming repair closures for the apertures of said plates, said means comprising a solid plug having an enlarged integral head at one end, the aperture of the plate being formed with a roughened counterbore terminating adjacent the inner surface of the plate in a shoulder portion, a fibre sleeve fitted on said plug and seating on the head of said plug, said plug and sleeve collectively being adapted to be driven into the roughened bore of the plate with said head in abutting engagement with said shoulder, with the sleeve expanded into the roughened surface of the bore in retaining the plug against displacement, said sleeve being adapted to expand when subjected to moisture in forming a positive seal and closure in the bore of said plate, and the outer end of the plug being flared over the corresponding end of said sleeve.

2. The herein described means of forming a seal upon a roughened surface in the bore of a tube plate, said means comprising a solid lead body having an outer surface substantially parallel to the bore in said plate, the bore in said plate having a shoulder at one end thereof, said body having an integral collar adapted to seat on said shoulder, a sleeve of relatively yieldable material fitting snugly on said body and upon the collar thereof and adapted to extend into the irregularities of the roughened surface of the bore of said tube, said sleeve being composed of fibre, and means including said collar confining the fibre sleeve within end limits of said lead body.

OLAF F. ANDERSON.

REFERENCES CITED

The following references are of record in the file of this patent:

UNITED STATES PATENTS

| Number | Name | Date |
| --- | --- | --- |
| 235,653 | Reynolds et al. | Dec. 21, 1880 |
| 354,859 | Gillette | Dec. 21, 1886 |
| 956,797 | Delaney | May 3, 1910 |
| 1,387,451 | Campbell | Aug. 16, 1921 |
| 1,617,451 | Kniskern | Feb. 15, 1927 |
| 1,661,997 | Campbell | Mar. 6, 1928 |
| 1,714,703 | Walton | May 28, 1929 |
| 2,396,469 | Meigs | Mar. 12, 1946 |